(12) United States Patent
Kim et al.

(10) Patent No.: US 11,505,727 B2
(45) Date of Patent: *Nov. 22, 2022

(54) ADHESIVE COMPOSITION AND POLARIZATION PLATE COMPRISING ADHESIVE LAYER FORMED USING SAME

(71) Applicant: SHANJIN OPTOELECTRONICS (SUZHOU) CO., LTD., Zhangjiagang (CN)

(72) Inventors: Dong Uk Kim, Daejeon (KR); Seongwook Kang, Daejeon (KR); Jin Woo Kim, Daejeon (KR); Yoonkyung Kwon, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 386 days.

This patent is subject to a terminal disclaimer.

(21) Appl. No.: 16/645,330

(22) PCT Filed: Sep. 19, 2018

(86) PCT No.: PCT/KR2018/011035
§ 371 (c)(1),
(2) Date: Mar. 6, 2020

(87) PCT Pub. No.: WO2019/059630
PCT Pub. Date: Mar. 28, 2019

(65) Prior Publication Data
US 2021/0024792 A1  Jan. 28, 2021

(30) Foreign Application Priority Data
Sep. 22, 2017  (KR) .................. 10-2017-0122478

(51) Int. Cl.
*C09J 163/00* (2006.01)
*G02B 5/30* (2006.01)
(Continued)

(52) U.S. Cl.
CPC ............. *C09J 163/00* (2013.01); *C09J 11/06* (2013.01); *G02B 5/30* (2013.01); *B32B 2457/20* (2013.01);
(Continued)

(58) Field of Classification Search
CPC .......... B32B 2457/20; B32B 2457/202; B32B 2457/206; C08K 5/11; C08K 5/1525;
(Continued)

(56) References Cited

U.S. PATENT DOCUMENTS

2003/0004278 A1  1/2003  Asano et al.
2013/0244041 A1  9/2013  Cho et al.
(Continued)

FOREIGN PATENT DOCUMENTS

JP  2000230016 A  8/2000
JP  2001151814 A  6/2001
(Continued)

OTHER PUBLICATIONS

International Search Report for PCT/KR2018/011035 dated Feb. 25, 2019.

*Primary Examiner* — Eli D. Strah
(74) *Attorney, Agent, or Firm* — Schmeiser, Olsen & Watts, LLP

(57) ABSTRACT

An adhesive composition including a first epoxy-based compound, a second epoxy-based compound, an oxetane compound, and a diacrylate-based compound is provided. A polarizing plate includes a polarizer, an adhesive layer provided on at least one surface of the polarizer and formed using the adhesive composition, and a protective film pro-
(Continued)

vided on at least one surface of the adhesive layer. An image display device using the polarizing plate is also provided.

10 Claims, 2 Drawing Sheets

(51) Int. Cl.
  *C09J 11/06* (2006.01)
  *C08K 5/11* (2006.01)
  *C08K 5/1525* (2006.01)
(52) U.S. Cl.
  CPC ... *B32B 2457/202* (2013.01); *B32B 2457/206* (2013.01); *C08K 5/11* (2013.01); *C08K 5/1525* (2013.01); *C09K 2323/055* (2020.08); *C09K 2323/057* (2020.08)
(58) Field of Classification Search
  CPC ... C09J 11/06; C09J 163/00; C09K 2323/055; C09K 2323/057; G02B 1/14; G02B 5/30; G02B 5/3033
  See application file for complete search history.

(56) References Cited

U.S. PATENT DOCUMENTS

| | | | |
|---|---|---|---|
| 2015/0099127 A1 | 4/2015 | Ogawa et al. | |
| 2020/0291278 A1* | 9/2020 | Kang | B32B 27/306 |
| 2020/0291279 A1* | 9/2020 | Kang | C09J 163/00 |

FOREIGN PATENT DOCUMENTS

| | | | | |
|---|---|---|---|---|
| JP | 2002120326 A | | 4/2002 | |
| JP | 2003121644 A | | 4/2003 | |
| JP | 2014129431 A | | 7/2014 | |
| JP | 2015137326 A | | 7/2015 | |
| KR | 20100100695 A | * | 9/2010 | C09J 163/00 |
| KR | 20100100695 A | | 9/2010 | |
| KR | 20120044237 A | | 5/2012 | |
| KR | 20130103290 A | | 9/2013 | |
| KR | 20150071019 A | | 6/2015 | |
| TW | 201231598 A | | 8/2012 | |
| WO | 2014058042 A1 | | 4/2014 | |

* cited by examiner

PRIOR ART

[FIG. 2]
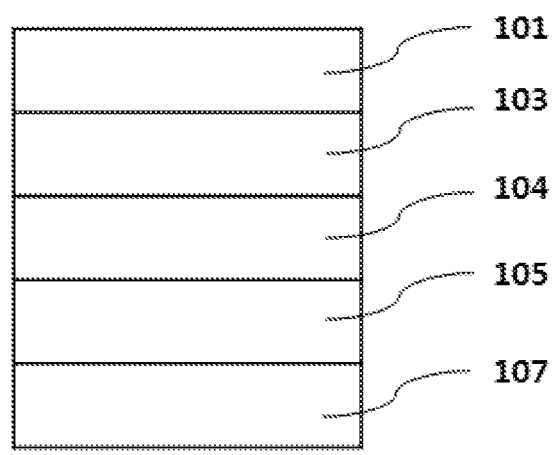

ADHESIVE COMPOSITION AND POLARIZATION PLATE COMPRISING ADHESIVE LAYER FORMED USING SAME

CROSS REFERENCE TO RELATED APPLICATIONS

The present application is a national stage entry under U.S.C. § 371 of International Application No. PCT/KR2018/011035 filed on Sep. 19, 2018, which claims priority to Korean Patent Application No. 10-2017-0122478, filed with the Korean Intellectual Property Office on Sep. 22, 2017, the entire contents of which are incorporated herein by reference.

TECHNICAL FIELD

The present specification relates to a polarizer including an adhesive composition and an adhesive layer formed using the same.

BACKGROUND ART

A polarizing plate uses a structure of laminating a protective film such as tri-acetyl-cellulose (TAC), acryl or a retardation film (COP) on one surface or both surfaces of a polarizer formed with a polyvinyl alcohol (hereinafter, PVA)-based resin using an adhesive. In order to provide surface coating or optical properties such as viewing angle compensation while physically protecting elongated PVA-$I_x$, a polarizing element, a protective film needs to be attached on both side surfaces of the polarizing element using an adhesive. As such an adhesive for a polarizing plate, hydrophilic and water-soluble aqueous adhesives have been widely used.

However, aqueous adhesives have inevitable limits in that a drying process is absolutely required and protective films with low moisture permeability may not be used. In addition, using a TAC film as a protective film causes a durability problem resulted from dimensional changes when used for a long period of time due to vulnerability to moisture, and using an acrylic film has a disadvantage in that adhesive strength is difficult to secure since hydrogen bonding with an aqueous adhesive is not sufficient even when potassium hydroxide treated or corona treated due to the small amount of introduced hydrophilic group. One of the systems that may overcome such limits of aqueous adhesives is a UV curing system that does not require a drying process since water or other solvents are not used.

Although a number of polarizing plate models still use aqueous adhesives, introducing UV curable adhesives is essential to secure high adhesive strength, excellent durability and reliability. UV adhesives comprise cation-based, radical-based or hybrid-based using both of these depending on the curing method. Cation-based adhesives normally use materials with epoxy and oxetane structures, and other materials are introduced thereto when used in order to obtain target properties. However, cation-based adhesives generate a dark reaction after curing, which causes problems such as running compression or winding compression of a polarizing plate. In addition thereto, there are problems in that it is readily affected by humidity when curing, and deviations in the curing state readily occur.

Radical-based adhesives normally use acrylate and exhibit the performance by using materials having other functional groups. Radical adhesives have an advantage of having a relatively higher curing rate compared to cation adhesives, however, are vulnerable to moisture that hydrogen bonds formed during curing are readily weakened under a high humidity environment.

As competitions in the LCD industry have intensified recently, demands for relatively low-priced acryl have been increasing. In the case of acryl, performing primer coating on one surface or both surfaces has been essential to prevent a surface blocking phenomenon. However, low thermal stability of the acrylic primer and defects occurring during the coating process, that is, foreign substances or cracks, have become a significant factor in lowering a polarizing plate yield. In addition, in preventing a surface blocking phenomenon, using a polyethylene terephthalate (PET) film as a protective film is cost efficient compared to primer coating, and therefore, necessity for attaching an acrylic bare surface has increased. Furthermore, since most display manufactures have production bases in hot and humid countries in Southeast Asia, products need to go through high temperature and high humidity environments during a transporting process, and herein, development of adhesives not causing decline in the adhesive strength or product qualities even under a high humidity environment has been required.

DISCLOSURE

Technical Problem

The present specification is directed to providing a polarizer including an adhesive composition and an adhesive layer formed using the same.

Technical Solution

One embodiment of the present specification provides an adhesive composition comprising a first epoxy-based compound; a second epoxy-based compound; an oxetane compound; and a diacrylate-based compound, wherein the oxetane compound comprises 3,3'-oxybis(methylene)bis(3-ethyloxetane), 3-ethyl-3-hydroxymethyloxetane and 3-ethyl-3-(2-ethylhexyloxy)methyloxetane, and the diacrylate-based compound comprises dicyclopentadiene diacrylate and dipropylene glycol diacrylate, and, with respect to 100 parts by weight of the adhesive composition, the oxetane compound is included in 32 parts by weight to 49 parts by weight, and the diacrylate-based compound is included in 8 parts by weight to 12 parts by weight.

Another embodiment of the present specification provides a polarizing plate comprising a polarizer; an adhesive layer provided on at least one surface of the polarizer and formed using the adhesive composition; and a protective film provided on at least one surface of the adhesive layer.

Still another embodiment of the present specification provides an image display device comprising a display panel; and the polarizing plate provided on one surface or both surfaces of the display panel.

Advantageous Effects

An adhesive composition according to one embodiment of the present specification is capable of obtaining excellent adhesive strength without a separate primer.

The adhesive composition according to one embodiment of the present specification does not use a separate primer, and therefore, is capable of preventing inflowing of foreign substances or an interface peel-off between a protective film and the primer generated from primer-caused defects.

The adhesive composition according to one embodiment of the present specification has excellent water resistance and is thereby capable of stably maintaining adhesive strength even under high humidity.

DESCRIPTION OF DRAWINGS

FIG. 2 illustrates a laminated structure of a polarizing plate according to one embodiment of the present specification.

REFERENCE NUMERAL

Figure 1:
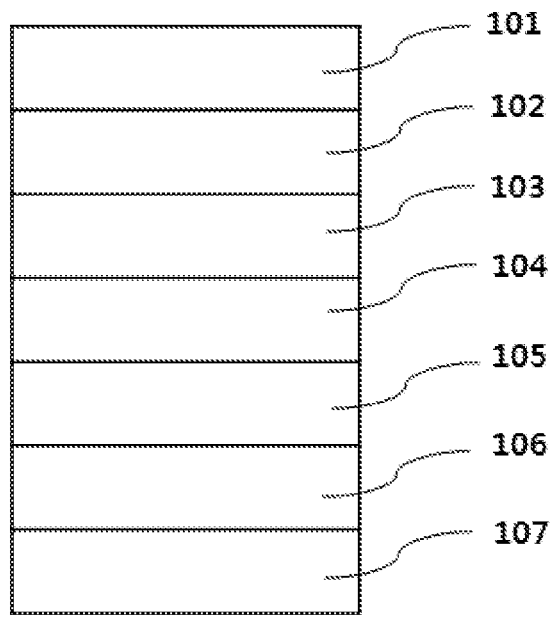
FIG. 1 illustrates a laminated structure of an existing polarizing plate comprising a primer.

101: First Protective Film
102: First primer
103: First Adhesive Layer
104: Polarizer
105: Second Adhesive Layer
106: Second Primer
107: Second Protective Film

MODE FOR DISCLOSURE

Hereinafter, the present specification will be described in more detail.

In the present specification, a description of a certain part "comprising" certain constituents means capable of further comprising other constituents, and does not exclude other constituents unless particularly stated on the contrary.

In the present specification, a description of a certain member being placed "on" another member comprises not only a case of the one member adjoining the another member but a case of still another member being present between the two members.

As demands for low light leakage and high durability increase with an increase in the size of polarizing plates, COP, PET, acryl and low moisture permeable substrates are used instead of TAC that has been used in the art as a protective substrate, and in particular, structures using acryl that may achieve effects in performance and cost savings as a protective substrate have tended to increase.

When using an acryl-based film as a protective substrate, it is difficult to obtain adhesion with an existing UV adhesive without a primer capable of improving adhesion, and primer treatment has had to be performed on the acryl-based film.

FIG. 1 illustrates a laminated structure of an existing polarizing plate. FIG. 1 illustrates a structure of a polarizing plate in which a first adhesive layer (103) and a second adhesive layer (105) are provided on both surfaces of a polarizer (104), a first primer (102) is provided on one surface of the first adhesive layer, a second primer (106) is provided on one surface of the second adhesive layer, a first protective film (101) is provided on one surface of the first primer, and a second protective film (107) is provided on one surface of the second primer.

However, when an acryl-based film is primer treated, a problem of a decreased production yield frequently occurs due to increased primer-caused defects, and therefore, demands on technologies directly attaching to an acryl-based film without a primer have increased.

The primer-caused defects comprise inflowing of foreign substances, an interface peel-off between an acryl-based film and a primer, and cracking of a primer layer and the like.

An adhesive composition according to one embodiment of the present specification is capable of obtaining excellent adhesive strength without a separate primer. In addition, since a separate primer is not used, inflowing of foreign substances or an interface peel-off between a protective film and the primer, which are generated from primer-caused defects, may be prevented.

In addition, the adhesive composition according to one embodiment of the present specification has excellent water resistance and is thereby capable of stably maintaining adhesive strength even under high humidity.

FIG. 2 illustrates a laminated structure of a polarizing plate according to one embodiment of the present specification. FIG. 2 illustrates a structure of a polarizing plate in which a first adhesive layer (103) and a second adhesive layer (105) are provided on both surfaces of a polarizer (104), a first protective film (101) is provided on one surface of the first adhesive layer, and a second protective film (107) is provided on one surface of the second adhesive layer.

One embodiment of the present specification provides an adhesive composition comprising a first epoxy-based compound; a second epoxy-based compound; an oxetane compound; and a diacrylate-based compound.

According to one embodiment of the present specification, the oxetane compound comprises 3,3'-oxybis(methylene)bis(3-ethyloxetane), 3-ethyl-3-hydroxymethyloxetane and 3-ethyl-3-(2-ethylhexyloxy)methyloxetane.

According to one embodiment of the present specification, the diacrylate-based compound is dicyclopentadiene diacrylate and dipropylene glycol diacrylate.

According to one embodiment of the present specification, the adhesive composition comprises the oxetane compound in 32 parts by weight to 49 parts by weight, and comprises the diacrylate-based compound in 8 parts by weight to 12 parts by weight with respect to 100 parts by weight of the adhesive composition.

When the oxetane compound is included in 32 parts by weight to 49 parts by weight with respect to 100 parts by weight of the adhesive composition, excellent adhesive strength and water resistance are obtained.

In addition, when the diacrylate-based compound is included in 8 parts by weight to 12 parts by weight with respect to 100 parts by weight of the adhesive composition, excellent adhesive strength and water resistance are obtained. More preferably, excellent adhesive strength and water resistance are obtained when dicyclopentadiene diacrylate and dipropylene glycol diacrylate, the two types of the diacrylate-based compounds, are included in a ratio of 1:1.

According to one embodiment of the present specification, the first epoxy-based compound is an alicyclic epoxy-based compound.

Specifically, the alicyclic epoxy-based compound means an epoxy-based compound in which an epoxy group is formed between two adjacent carbon atoms forming an aliphatic hydrocarbon ring. Examples thereof may comprise 2-(3,4-epoxy)cyclohexyl-5,5-spiro-(3,4-epoxy)cyclohexane-m-dioxane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, vinylcyclohexane dioxide, bis(3,4-epoxycyclohexylmethyl)adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropyl ether, 1-(2,3-epoxypropoxy)phenyl-5,6-epoxyhexahydro-4,7-methanoindane, o-(2,3-epoxy) cyclopentylphenyl-2,3-epoxypropyl ether), 1,2-bis[5-(1,2-epoxy)-4,7-hexahydromethanoindanoxyl]ethane cyclopentenyl phenyl glycidyl ether, methylenebis(3,4-epoxycyclohexane)ethylene glycol di(3,4-epoxycyclohexylmethyl) ether, ethylenebis(3,4-epoxycyclohexane carboxylate), c-caprolactone additives of 3,4-epoxycyclohexane methanol, ester compounds of multivalent (3 to 20) alcohols, and the like, and particularly, 3,4-epoxycyclohexylmethyl-3,4-epoxycyclohexane carboxylate is preferred, however, the alicyclic epoxy-based compound is not limited thereto.

According to one embodiment of the present specification, the first epoxy-based compound is included in 20 parts by weight to 50 parts by weight with respect to 100 parts by weight of the adhesive composition.

When the first epoxy-based compound is included in 20 parts by weight to 50 parts by weight with respect to 100 parts by weight of the adhesive composition, curing rate and adhesive strength may be enhanced, and viscosity may be satisfactorily kept at less than 100 cps.

According to one embodiment of the present specification, the second epoxy-based compound is an aliphatic epoxy-based compound.

Specifically, the aliphatic epoxy-based compound means an epoxy-based compound comprising an aliphatic chain or an aliphatic ring in the molecule. Examples thereof may comprise 1,4-cyclohexane dimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylol propane triglycidyl ether, n-butyl glycidyl ether, 2-ethylhexyl glycidyl ether and the like, and particularly, using 1,4-cyclohexane dimethanol diglycidyl ether and neopentyl diglycidyl ether is preferred, however, the aliphatic epoxy-based compound is not limited thereto. In addition, the second epoxy-based compound may be one, or two or more types of compounds selected from among the aliphatic epoxy-based compounds.

According to one embodiment of the present specification, the second epoxy-based compound is included in 10 parts by weight to 30 parts by weight with respect to 100 parts by weight of the adhesive composition.

When the second epoxy-based compound is included in 10 parts by weight to 30 parts by weight with respect to 100 parts by weight of the adhesive composition, adhesion between a substrate and PVA may be enhanced further increasing adhesive strength.

According to one embodiment of the present specification, 3,3'-oxybis(methylene)bis(3-ethyloxetane) is included in 4 parts by weight to 8 parts by weight, 3-ethyl-3-hydroxymethyloxetane is included in 4 parts by weight to 6 parts by weight, and 3-ethyl-3-(2-ethylhexyloxy)methyloxetane is included in 24 parts by weight to 35 parts by weight with respect to 100 parts by weight of the adhesive composition.

Specifically, when the 3,3'-oxybis(methylene)bis(3-ethyloxetane) is included in 4 parts by weight to 8 parts by weight with respect to 100 parts by weight of the adhesive composition, high water resistance is obtained. When the 3-ethyl-3-hydroxymethyloxetane is included in 4 parts by weight to 6 parts by weight with respect to 100 parts by weight of the adhesive composition, high water resistance is obtained. In addition, when the 3-ethyl-3-(2-ethylhexyloxy)methyloxetane is included in 24 parts by weight to 35 parts by weight with respect to 100 parts by weight of the adhesive composition, excellent adhesive strength and water resistance are obtained.

According to one embodiment of the present specification, the adhesive composition has a glass transition temperature of 50° C. or higher, preferably 60° C. or higher, and more preferably 70° C. or higher. Although the upper limit is not separately limited since it is thermally stable as the glass transition temperature is higher, the glass transition temperature is preferably 200° C. or lower.

In the present specification, the glass transition temperature is a value measuring a glass transition temperature by, using a differential scanning calorimeter (DSC, Mettler Toledo), putting approximately 10 mg of sample into a dedicated pan, and plotting a temperature-dependent endothermic and exothermic amount of the material caused from a phase transition when heating under a constant temperature-raising environment.

<Method of Measuring Glass Transition Temperature (Tg)>

The glass transition temperature of the adhesive layer is identified using a differential scanning calorimeter (DSC, Mettler Toledo). After separating the adhesive layer of the polarizing plate prepared under the curing condition as above, the temperature is raised from −30° C. to 200° C., and the glass transition temperature at the second run is measured.

According to one embodiment of the present specification, the adhesive composition may further comprise a cation polymerization initiator.

In the present specification, the cation polymerization initiator means a compound generating acids ($H^+$) by active energy rays, and the cation polymerization initiator capable of being used in the present disclosure preferably comprises a sulfonium salt or an iodonium salt. Specific examples of the photoacid generator comprising a sulfonium salt or an iodonium salt may comprise one or more types selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium) dihexafluoroantimonate and (thiodi-4,1-phenylene)bis(diphenylsulfonium) dihexafluorophosphate, but are not limited thereto.

In one embodiment of the present specification, examples of the cation polymerization initiator may comprise alpha-hydroxyketone-based compounds (ex. IRGACURE 184, IRGACURE 500, IRGACURE 2959, DAROCUR 1173; Ciba Specialty Chemicals (manufacturer)); phenylglyoxylate-based compounds (ex. IRGACURE 754, DAROCUR MBF; Ciba Specialty Chemicals (manufacturer)); benzyl dimethyl ketal-based compounds (ex. IRGACURE 651; Ciba Specialty Chemicals (manufacturer)); α-aminoketone-based compounds (ex. IRGACURE 369, IRGACURE 907, IRGACURE 1300; Ciba Specialty Chemicals (manufacturer)); monoacylphosphine-based compounds (MAPO) (ex. DAROCUR TPO; Ciba Specialty Chemicals (manufacturer)); bisacylphosphene-based compounds (BAPO) (ex. IRGACURE 819, IRGACURE 819DW; Ciba Specialty Chemicals (manufacturer)); phosphine oxide-based compounds (ex. IRGACURE 2100; Ciba Specialty Chemicals (manufacturer)); metallocene-based compounds (ex. IRGACURE 784; Ciba Specialty Chemicals (manufacturer)); iodonium salts (ex. IRGACURE 250; Ciba Specialty Chemicals (manufacturer)); mixtures of one or more thereof (ex. DAROCUR 4265, IRGACURE 2022, IRGACURE 1300, IRGACURE 2005, IRGACURE 2010, IRGACURE 2020; Ciba Specialty Chemicals (manufacturer)) and the like. In the present disclosure, one, or two or more types thereof may be used, however, the cation polymerization initiator is not limited thereto.

According to one embodiment of the present specification, the adhesive composition may further comprise a radical initiator.

The radical initiator according to one embodiment of the present specification is for enhancing a curing rate by facilitating radical polymerization, and as the radical initiator, radical initiators generally used in the art may be used without limit.

Examples of the radical initiator may comprise one or more types selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methyl benzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide and phenylbis(2,4,6-trimethylbenzoyl)-phosphine oxide. Particularly, phenylbis(2,4,6-trimethylbenzoyl)-phosphine oxide may be used in the present specification, however, the radical initiator is not limited thereto.

According to one embodiment of the present specification, the adhesive composition may further comprise a photosensitizer.

Examples of the photosensitizer may comprise carbonyl compounds, organosulfur compounds, persulfates, redox-based compounds, azo and diazo compounds, anthracene-based compounds, halogen compounds, photoreductive dyes and the like, but are not limited thereto.

In one embodiment of the present specification, the photosensitizer may be included in 0.01 parts by weight to 5 parts by weight with respect to 100 parts by weight of the adhesive composition.

In addition, the adhesive composition of the present specification may further comprise a silane coupling agent as necessary. When comprising a silane coupling agent, the silane coupling agent lowers surface energy of the adhesive leading to an effect of enhancing a wetting property of the adhesive.

Herein, the silane coupling agent more preferably comprises a cation polymerizable functional group such as an epoxy group, a vinyl group or a radical group. In addition, using a silane coupling agent that comprises a cation polymerizable functional group is effective in improving a wetting property without lowering a glass transition temperature compared to a silane coupling agent that does not comprise a surfactant or a cation polymerizable functional group. This is due to the fact that the cation polymerizable functional group of the silane coupling agent reduces lowering of a glass transition temperature of the adhesive layer after curing while forming a crosslinked form as it reacts with the silane group of the adhesive composition.

One embodiment of the present specification provides a polarizing plate comprising a polarizer; an adhesive layer provided on at least one surface of the polarizer and formed using the adhesive composition; and a protective film provided on at least one surface of the adhesive layer.

The polarizer is not particularly limited, and polarizers well known in the art such as films formed with polyvinyl alcohol (PVA) comprising iodine or a dichroic dye may be used. The polarizer may be prepared by dyeing a PVA film with iodine or a dichroic dye, however, the preparation method thereof is not particularly limited. In the present specification, the polarizer means a state not comprising a protective film, and the polarizing plate means a state comprising a polarizer and a protective film.

Next, the adhesive layer is formed using the adhesive composition according to the embodiments of the present specification described above, and may be formed using methods well known in the art. For example, a method of forming the adhesive layer by coating the adhesive composition on one surface of a polarizer or a protective film, laminating the polarizer and the protective film, and then curing the result may be used. Herein, the coating may be performed using coating methods well known in the art such as spin coating, bar coating, roll coating, gravure coating or blade coating.

According to one embodiment of the present specification, the adhesive layer has a thickness of greater than 0 μm and less than or equal to 20 μm.

Specifically, the adhesive layer preferably has a thickness of greater than 0 μm and less than or equal to 10 μm, and more preferably has a thickness of 0.1 μm to 10 μm or 0.1 μm to 5 μm. When the adhesive layer thickness is too small, uniformity and adhesive strength of the adhesive layer may decline, and the adhesive layer thickness being too large may cause a problem of producing wrinkles on the appearance of the polarizing plate.

According to one embodiment of the present specification, the protective film is for supporting and protecting a polarizer, and protective films made of various materials generally known in the art such as cellulose-based films, polyethylene terephthalate (PET) films, cycloolefin polymer (COP) films or acryl-based films may be used without limit. Among these, using acryl-based films is particularly preferred considering optical properties, durability, economic feasibility and the like.

Meanwhile, the acryl-based film capable of being used in the present specification may be obtained through molding a molding material comprising a (meth)acrylate-based resin as a main component by extrusion molding. Herein, the (meth)acrylate-based resin employs a resin comprising a (meth)acrylate-based unit as a main component, and is a concept comprising, as well as a homopolymer resin formed with a (meth)acrylate-based unit, a copolymer resin copolymerizing other monomer units in addition to the (meth)acrylate-based unit and a blend resin blending other resins to such a (meth)acrylate-based resin.

Meanwhile, the (meth)acrylate-based unit may be, for example, an alkyl (meth)acrylate-based unit. Herein, the alkyl (meth)acrylate-based unit means both an alkyl acrylate unit and an alkyl methacrylate unit, and the alkyl group of the alkyl (meth)acrylate-based unit preferably has 1 to 10 carbon atoms, and more preferably has 1 to 4 carbon atoms.

In addition, examples of the monomer unit copolymerizable with the (meth)acrylate-based unit may comprise a styrene-based unit, a maleic anhydride-based unit, a maleimide-based unit and the like. Herein, examples of the styrene-based unit may comprises, but are not limited to, styrene, α-methylstyrene and the like; examples of the maleic anhydride-based monomer may comprises, but are not limited to, maleic anhydride, methyl maleic anhydride, cyclohexyl maleic anhydride, phenyl maleic anhydride and the like; and examples of the maleimide-based monomer may comprise, but are not limited to, maleimide, N-methyl maleimide, N-cyclohexyl maleimide, N-phenyl maleimide and the like. These may be used either alone or as a mixture thereof.

Meanwhile, the acryl-based film may be a film comprising a (meth)acrylate-based resin having a lactone ring structure. Specific examples of the (meth)acrylate-based resin having a lactone ring structure may comprise (meth)acrylate-based resins having a lactone ring structure described in Japanese Patent Application Laid-Open Publication No. 2000-230016, Japanese Patent Application Laid-Open Publication No. 2001-151814, Japanese Patent Application Laid-Open Publication No. 2002-120326 and the like.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then film molding the result, or may be prepared by preparing an (meth)acrylate-based resin, other polymers, additives and the like as separate solutions, then forming a uniformly mixed solution by mixing the separately prepared solutions, and film molding the result. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

In addition, the acryl-based film is preferably a film having primer coating on the acryl-based film or an acryl bare-type film without primer coating, but is not limited thereto.

One embodiment of the present specification provides an image display device comprising a display panel; and the polarizing plate described above provided on one surface or both surfaces of the display panel.

The display panel may be a liquid crystal panel, a plasma panel and an organic light emitting panel.

Accordingly, the image display device may be a liquid crystal display device (LCD), a plasma display panel device (PDP) and an organic electroluminescent display device (OLED).

More specifically, the image display device may be a liquid crystal display device comprising a liquid crystal panel and polarizing plates each provided on both surfaces of this liquid crystal panel, and herein, at least one of the polarizing plates may be a polarizing plate comprising the polarizer according to one embodiment of the present specification described above. In other words, the polarizing plate has, in a polarizing plate comprising an iodine and/or dichroic dye-dyed polyvinyl alcohol-based polarizer and a protective film provided on at least one surface of the polyvinyl alcohol-based polarizer, a locally depolarized area with single body transmittance of 80% or greater in a 400 nm to 800 nm wavelength band, and the depolarized area has arithmetic mean roughness (Ra) of 200 nm or less, a polarization degree of 10% or less and sagging of 10 μm or less.

Herein, types of the liquid crystal panel included in the liquid crystal display device are not particularly limited. For example, known panels comprising passive matrix type panels such as a twisted nematic (TN) type, a super twisted nematic (STN) type, a ferroelectic (F) type or a polymer dispersed (PD) type; active matrix type panels such as a two terminal type or a three terminal type; in plane switching (IPS) type panels, vertical alignment (VA) type panels, and the like, may all be used without being limited in the type.

In addition, other constitutions forming the liquid crystal display device, for example, types of upper and lower substrates (for example, color filter substrate or array substrate) and the like, are not particularly limited as well, and constitutions known in the art may be employed without limit.

Hereinafter, the present specification will be described in detail with reference to examples in order to specifically describe the present specification. However, the examples according to the present specification may be modified to various different forms, and the scope of the present specification is not to be construed as being limited to the examples described below. Examples of the present specification are provided in order to more fully describe the present specification to those having average knowledge in the art.

EXAMPLE

Experimental Example 1

(1) Preparation of Adhesive Composition

An adhesive composition was prepared by using celloxide 2021p as a first epoxy-based compound, 1,4-cyclohexanedimethanol diglycidyl ether (LD 204, Hajin Chemtech Corporation) as a second epoxy-based compound, three types of 3,3'-oxybis(methylene)bis(3-ethyloxetane) (OXT 221), 3-ethyl-3-hydroxymethyloxetane (OXT 101) and 3-ethyl-3-(2-ethylhexyloxy)methyloxetane (OXT 212) as an oxetane compound, and two types of dicyclopentadiene diacrylate (DCPDA) and dipropylene glycol diacrylate (DPGDA) as a diacrylate-based compound. In addition, 3 parts by weight of Irgacure 250 as a polymerization initiator and 1 parts by weight of ESACURE ITX as a photosensitizer with respect to 100 parts by weight of the adhesive composition were mixed thereto to prepare a final adhesive composition. The content of each composition other than the polymerization initiator and the photosensitizer is as described in the following Table 1.

(2) Manufacture of Polarizing Plate

After 40 μm of an acrylic film and 60 μm of a UV absorber (LA F70)-added acrylic film were each corona (5 v, 3 times) treated, the corona treated acrylic films were attached on both side surfaces of a PVA element, and then 2 ml of the adhesive composition prepared using the above-mentioned method was coated using a pipette, and the result passed through a laminator (Excellami-355Q) after setting the rate at 5 m/min and the pressure range at 7. After that, the laminated polarizing plate was irradiated with 2000 mJ/cm$^2$ ultraviolet rays on a UV irradiation device (metal halide lamp) belt to prepare a polarizing plate.

Experimental Examples 1-1 to 1-11

An adhesive composition and a polarizing plate were each prepared in the same manner as the methods of preparing the adhesive composition and the polarizing plate in Experimental Example 1 except that each content varied as in the following Table 1.

Experimental Examples 2 to 6 and Experimental Examples 2-1 to 2-6

An adhesive composition and a polarizing plate were each prepared in the same manner as the methods of preparing the adhesive composition and the polarizing plate in Experimental Example 1 except that each content varied as in the following Table 2.

Experimental Examples 7 to 9 and Experimental Examples 3-1 to 3-3

An adhesive composition and a polarizing plate were each prepared in the same manner as the methods of preparing the adhesive composition and the polarizing plate in Experimental Example 1 except that each content varied as in the following Table 3.

Experimental Example 10, Experimental Example 11 and Experimental Examples 4-1 to 4-3

An adhesive composition and a polarizing plate were each prepared in the same manner as the methods of preparing the adhesive composition and the polarizing plate in Experimental Example 1 except that each content varied as in the following Table 4.

Experimental Example 12, Experimental Example 13 and Experimental Examples 5-1 to 5-4

An adhesive composition and a polarizing plate were each prepared in the same manner as the methods of preparing the adhesive composition and the polarizing plate in Experimental Example 1 except that each content varied as in the following Table 5.

Evaluation Example

Evaluation Example 1

Evaluation on Polarizing Plate Peel Strength

For each of the polarizing plates manufactured in Experimental Examples 1 to 13, Experimental Examples 1-1 to 1-11, Experimental Examples 2-1 to 2-6, Experimental Examples 3-1 to 3-3, Experimental Examples 4-1 to 4-3 and Experimental Examples 5-1 to 5-4, peel strength between the polarizer and the polarizing plate protective film was measured. As for the peeling experiment, peel strength when peeled off at a rate of 300 m/min and 90° was measured using the polarizing plate having a width of 20 mm and a length of 100 mm. The results are shown as adhesive strength of Tables 1 to 5 (unit: N/cm$^2$).

ACR bare 40 and ACR bare 60 are protective films protecting a polarizer, and ACR bare 40 means an acrylic film located on the first surface (above based on the polarizer), and ACR bare 60 means an acrylic film located on the second surface (below based on the polarizer). In other words, the layer corresponding to upper TAC is ACR bare 60 and the layer corresponding to a lower TAC is ACR bare 40 in the polarizing plate.

Evaluation Example 2

Evaluation on High Temperature Water Resistance

For each of the polarizing plates manufactured in Experimental Examples 1 to 13, Experimental Examples 1-1 to 1-11, Experimental Examples 2-1 to 2-6, Experimental Examples 3-1 to 3-3, Experimental Examples 4-1 to 4-3 and Experimental Examples 5-1 to 5-4, an evaluation on high temperature water resistance was progressed. After cutting the manufactured polarizing plate to a width of 6 mm and a length of 10 mm, the cut polarizing plate was left unattended for 24 hours at a 60° C. thermostat. Leakage of light due to crack development caused by polarizer shrinkage was observed, and OK and NG were determined depending on the occurrences of light leaking cracks (cracks not occurred: OK, cracks occurred: NG). The results are shown in the following Tables 1 to 5.

Evaluation Example 3

Evaluation on Thermal Shock

For each of the polarizing plates manufactured in Experimental Examples 1 to 13, Experimental Examples 1-1 to 1-11, Experimental Examples 2-1 to 2-6, Experimental Examples 3-1 to 3-3, Experimental Examples 4-1 to 4-3 and Experimental Examples 5-1 to 5-4, an evaluation on thermal shock was progressed. After progressing durability evaluation on the glass laminated polarizing plate (−40° C. to 80° C., 100 cycles), an appearance of the polarizing plate was evaluated (no deformation: OK, PVA cracks occurred: NG). The results are shown in the following Tables 1 to 5.

Evaluation Example 4

Evaluation on Lifting Occurrences

For each of the polarizing plates manufactured in Experimental Examples 1 to 13, Experimental Examples 1-1 to 1-11, Experimental Examples 2-1 to 2-6, Experimental Examples 3-1 to 3-3, Experimental Examples 4-1 to 4-3 and Experimental Examples 5-1 to 5-4, an evaluation on lifting occurrences was progressed. After leaving the glass laminated polarizing plate for 24 hours in a 60° C. thermostat, the cut surface was checked (lifting not occurred: OK, lifting occurred: NG). The results are shown in the following Tables 1 to 5.

TABLE 1

| | Epoxy | | Oxetane | | | Acrylate | | Adhesive Strength (N/cm$^2$) | | | | |
| --- | --- | --- | --- | --- | --- | --- | --- | --- | --- | --- | --- | --- |
| | | | | | | | | ACR bare | ACR bare | | Water | Thermal |
| No. | 2021P | LD204 | OXT221 | OXT101 | OXT212 | DPGDA | DCPDA | (40) | (60) | Lifting | Resistance | Shock |
| Experimental Example 1 | 30 | 20 | 5 | 5 | 30 | 5 | 5 | 2.9 | 2.2 | OK | OK | OK |
| Experimental Example 1-1 | 30 | 20 | 40 | — | — | 5 | 5 | 1.7 | 0.4 | NG | NG | OK |

TABLE 1-continued

| No. | Epoxy | | Oxetane | | | Acrylate | | Adhesive Strength (N/cm²) | | Lifting | Water Resistance | Thermal Shock |
| --- | --- | --- | --- | --- | --- | --- | --- | --- | --- | --- | --- | --- |
| | 2021P | LD204 | OXT221 | OXT101 | OXT212 | DPGDA | DCPDA | ACR bare (40) | ACR bare (60) | | | |
| Experimental Example 1-2 | 30 | 20 | — | 40 | — | 5 | 5 | 2.7 | 1.3 | NG | NG | NG |
| Experimental Example 1-3 | 30 | 20 | — | — | 40 | 5 | 5 | 1.8 | 1.5 | NG | OK | NG |
| Experimental Example 1-4 | 31 | 21 | — | 6 | 31 | 5.5 | 5.5 | 2.1 | 1.6 | NG | OK | OK |
| Experimental Example 1-5 | 31 | 21 | 6 | — | 31 | 5.5 | 5.5 | 1.5 | 1.9 | NG | OK | OK |
| Experimental Example 1-6 | 32 | 22 | 7 | 7 | 32 | — | — | 2.1 | 1.3 | NG | OK | OK |
| Experimental Example 1-7 | 30 | 20 | 5 | 5 | 30 | 10 | — | 2.6 | 1.8 | NG | OK | OK |
| Experimental Example 1-8 | 30 | 20 | 5 | 5 | 30 | — | 10 | 2.4 | 1.9 | NG | OK | OK |
| Experimental Example 1-9 | 32 | 22 | 7 | 7 | 20 | 6 | 6 | 2.1 | 1.4 | NG | NG | OK |
| Experimental Example 1-10 | 29 | 19 | 10 | 4 | 29 | 4.5 | 4.5 | 1.8 | 1.7 | NG | OK | OK |
| Experimental Example 1-11 | 29 | 19 | 4 | 10 | 29 | 4.5 | 4.5 | 2.1 | 1.3 | NG | NG | OK |

As shown in Table 1, it was seen that Experimental Example 1 using all three types of the oxetane compounds of the present specification had enhanced lifting prevention, adhesive strength and water resistance compared to Experimental Examples 1-1 to 1-5 using one or two types of the oxetane compounds. In addition, Experimental Example 1 using both two types of the diacrylate-based compounds of the present specification had enhanced lifting prevention and adhesive strength compared to Experimental Examples 1-6 to 1-8 that did not use two types of the diacrylate-based compound or used only one type of the diacrylate-based compound.

In addition, Experimental Example 1 satisfying 4 parts by weight to 8 parts by weight of 3,3'-oxybis(methylene)bis(3-ethyloxetane) (OXT 221), 4 parts by weight to 6 parts by weight of 3-ethyl-3-hydroxymethyloxetane (OXT 101) and 24 parts by weight to 35 parts by weight of 3-ethyl-3-(2-ethylhexyloxy)methyloxetane (OXT 212) with respect to 100 parts by weight of the adhesive composition had enhanced adhesive strength, lifting prevention and water resistance.

TABLE 2

| No. | Epoxy | | Oxetane | | | Acrylate | | Adhesive Strength (N/cm²) | | Lifting | Water Resistance | Thermal Shock |
| --- | --- | --- | --- | --- | --- | --- | --- | --- | --- | --- | --- | --- |
| | 2021P | LD204 | OXT221 | OXT101 | OXT212 | DPGDA | DCPDA | ACR bare (40) | ACR bare (60) | | | |
| Experimental Example 2 | 30 | 20 | 5 | 5 | 30 | 5 | 5 | 2.8 | 2 | OK | OK | OK |
| Experimental Example 3 | 30 | 20 | 5 | 5 | 29 | 5 | 5 | 2.3 | 2.2 | OK | OK | OK |
| Experimental Example 4 | 30 | 20 | 5 | 5 | 32 | 5 | 5 | 2.7 | 2.2 | OK | OK | OK |
| Experimental Example 5 | 30 | 20 | 5 | 5 | 35 | 5 | 5 | 1.6 | 2 | OK | OK | OK |
| Experimental Example 6 | 30 | 20 | 5 | 5 | 26 | 5 | 5 | 2.3 | 2.1 | OK | OK | OK |
| Experimental Example 2-1 | 30 | 20 | 5 | 5 | 23 | 5 | 5 | 2.4 | 1.8 | NG | OK | OK |
| Experimental Example 2-2 | 30 | 20 | 5 | 5 | 38 | 5 | 5 | 1 | 1.7 | NG | OK | OK |
| Experimental Example 2-3 | 30 | 20 | 5 | 5 | 10 | 5 | 5 | 2.3 | 1.2 | NG | NG | OK |

TABLE 2-continued

| No. | Epoxy 2021P | Epoxy LD204 | Oxetane OXT221 | Oxetane OXT101 | Oxetane OXT212 | Acrylate DPGDA | Acrylate DCPDA | Adhesive Strength ($N/cm^2$) ACR bare (40) | Adhesive Strength ($N/cm^2$) ACR bare (60) | Lifting | Water Resistance | Thermal Shock |
|---|---|---|---|---|---|---|---|---|---|---|---|---|
| Experimental Example 2-4 | 30 | 20 | 5 | 5 | 20 | 5 | 5 | 2.3 | 1.5 | NG | NG | OK |
| Experimental Example 2-5 | 30 | 20 | 5 | 5 | 40 | 5 | 5 | 1.7 | 1.5 | NG | OK | OK |
| Experimental Example 2-6 | 30 | 20 | 5 | 5 | 50 | 5 | 5 | 1.6 | 1.3 | NG | OK | NG |

As shown in Table 2, it was seen that Experimental Examples 2 to 6 satisfying 24 parts by weight to 35 parts by weight of the 3-ethyl-3-(2-ethylhexyloxy)methyloxetane (OXT 212) among the oxetane compounds of the present specification with respect to 100 parts by weight of the adhesive composition had enhanced lifting prevention and adhesive strength compared to Experimental Examples 2-1 to 2-6 not satisfying the above-mentioned content range.

TABLE 3

| No. | Epoxy 2021P | Epoxy LD204 | Oxetane OXT221 | Oxetane OXT101 | Oxetane OXT212 | Acrylate DPGDA | Acrylate DCPDA | Adhesive Strength ($N/cm^2$) ACR bare (40) | Adhesive Strength ($N/cm^2$) ACR bare (60) | Lifting | Water Resistance | Thermal Shock |
|---|---|---|---|---|---|---|---|---|---|---|---|---|
| Experimental Example 7 | 30 | 20 | 4 | 5 | 30 | 5 | 5 | 2.6 | 2.1 | OK | OK | OK |
| Experimental Example 8 | 30 | 20 | 6 | 5 | 30 | 5 | 5 | 2.8 | 2.1 | OK | OK | OK |
| Experimental Example 9 | 30 | 20 | 8 | 5 | 30 | 5 | 5 | 2.3 | 2.1 | OK | OK | OK |
| Experimental Example 3-1 | 30 | 20 | — | 5 | 30 | 5 | 5 | 2.4 | 1.8 | NG | OK | OK |
| Experimental Example 3-2 | 30 | 20 | 2 | 5 | 30 | 5 | 5 | 2.7 | 1.8 | NG | OK | OK |
| Experimental Example 3-3 | 30 | 20 | 10 | 5 | 30 | 5 | 5 | 2.3 | 1.9 | NG | OK | OK |

As shown in Table 3, it was seen that Experimental Examples 7 to 9 satisfying 4 parts by weight to 8 parts by weight of the 3,3'-oxybis(methylene)bis(3-ethyloxetane) (OXT 221) among the oxetane compounds of the present specification with respect to 100 parts by weight of the adhesive composition had enhanced lifting prevention and adhesive strength compared to Experimental Examples 3-1 to 3-3 not satisfying the above-mentioned content range.

TABLE 4

| No. | Epoxy 2021P | Epoxy LD204 | Oxetane OXT221 | Oxetane OXT101 | Oxetane OXT212 | Acrylate DPGDA | Acrylate DCPDA | Adhesive Strength ($N/cm^2$) ACR bare (40) | Adhesive Strength ($N/cm^2$) ACR bare (60) | Lifting | Water Resistance | Thermal Shock |
|---|---|---|---|---|---|---|---|---|---|---|---|---|
| Experimental Example 10 | 30 | 20 | 5 | 4 | 30 | 5 | 5 | 2.4 | 2.2 | OK | OK | OK |
| Experimental Example 11 | 30 | 20 | 5 | 6 | 30 | 5 | 5 | 2.4 | 2.1 | OK | OK | OK |

TABLE 4-continued

| No. | Epoxy | | Oxetane | | | Acrylate | | Adhesive Strength (N/cm²) | | Lifting | Water Resistance | Thermal Shock |
| | 2021P | LD204 | OXT221 | OXT101 | OXT212 | DPGDA | DCPDA | ACR bare (40) | ACR bare (60) | | | |
| --- | --- | --- | --- | --- | --- | --- | --- | --- | --- | --- | --- | --- |
| Experimental Example 4-1 | 30 | 20 | 5 | — | 30 | 5 | 5 | 2.1 | 1.6 | NG | OK | OK |
| Experimental Example 4-2 | 30 | 20 | 5 | 2 | 30 | 5 | 5 | 1.9 | 1.8 | NG | OK | OK |
| Experimental Example 4-3 | 30 | 20 | 5 | 8 | 30 | 5 | 5 | 2.6 | 1.9 | NG | NG | NG |

As shown in Table 4, it was seen that Experimental Examples 10 and 11 satisfying 4 parts by weight to 6 parts by weight of the 3-ethyl-3-hydroxymethyloxetane (OXT 101) among the oxetane compounds of the present specification with respect to 100 parts by weight of the adhesive composition had enhanced lifting prevention and adhesive strength compared to Experimental Examples 4-1 to 4-3 not satisfying the above-mentioned content range. Particularly, it was seen that a problem on thermal shock further occurred when the 3-ethyl-3-hydroxymethyloxetane (OXT 101) content was greater than 6 parts by weight.

TABLE 5

| No. | Epoxy | | Oxetane | | | Acrylate | | Adhesive Strength (N/cm²) | | Lifting | Water Resistance | Thermal Shock |
| | 2021P | LD204 | OXT221 | OXT101 | OXT212 | DPGDA | DCPDA | ACR bare (40) | ACR bare (60) | | | |
| --- | --- | --- | --- | --- | --- | --- | --- | --- | --- | --- | --- | --- |
| Experimental Example 12 | 30 | 20 | 5 | 5 | 30 | 4 | 4 | 2.4 | 2.1 | OK | OK | OK |
| Experimental Example 13 | 30 | 20 | 5 | 5 | 30 | 6 | 6 | 2.3 | 2 | OK | OK | OK |
| Experimental Example 5-1 | 30 | 20 | 5 | 5 | 30 | — | — | 2.7 | 1.3 | NG | OK | OK |
| Experimental Example 5-2 | 30 | 20 | 5 | 5 | 30 | 2 | 2 | 2.5 | 1.6 | NG | OK | OK |
| Experimental Example 5-3 | 30 | 20 | 5 | 5 | 30 | 8 | 8 | 1.7 | 1.6 | NG | OK | OK |
| Experimental Example 5-4 | 30 | 20 | 5 | 5 | 30 | 10 | 10 | 1.7 | 1.3 | NG | NG | OK |

As shown in Table 5, it was seen that Experimental Examples 12 and 13 satisfying 8 parts by weight to 12 parts by weight of two types of the diacrylate-based compounds of the present specification with respect to 100 parts by weight the adhesive composition had enhanced lifting prevention and adhesive strength compared to Examples 5-1 to 5-4 not satisfying the above-mentioned content range.

Hereinbefore, preferred embodiments of the present specification have been described, however, the present disclosure is not limited thereto, and various modifications may be made within the scope of the claims and the detailed descriptions of the disclosure, and these also fall within the category of the disclosure.

The invention claimed is:
1. An adhesive composition comprising:
a first epoxy-based compound;
a second epoxy-based compound;
an oxetane compound; and
a diacrylate-based compound,
wherein the oxetane compound comprises 3,3'-oxybis(methylene)bis(3-ethyloxetane), 3-ethyl-3-hydroxymethyloxetane and 3-ethyl-3-(2-ethylhexyloxy)methyloxetane,
the diacrylate-based compound comprises dicyclopentadiene diacrylate and dipropylene glycol diacrylate, and
the oxetane compound is included in 32 parts by weight to 49 parts by weight and the diacrylate-based compound is included in 8 parts by weight to 12 parts by weight with respect to 100 parts by weight of the adhesive composition, wherein the oxetane compound includes the 3,3'-oxybis(methylene)bis(3-ethyloxetane) in 4 parts by weight to 8 parts by weight, the 3-ethyl-3-hydroxymethyloxetane in 4 parts by weight to 6 parts by weight, and the 3-ethyl-3-(2-ethylhexyloxy)methyloxetane in 24 parts by weight to 35 parts by weight with respect to 100 parts by weight of the adhesive composition.

2. The adhesive composition of claim 1, wherein the first epoxy-based compound is an alicyclic epoxy-based compound.

3. The adhesive composition of claim 1, wherein the first epoxy-based compound is included in 20 parts by weight to 50 parts by weight with respect to 100 parts by weight of the adhesive composition.

4. The adhesive composition of claim 1, wherein the second epoxy-based compound is an aliphatic epoxy-based compound.

5. The adhesive composition of claim 1, wherein the second epoxy-based compound is included in 10 parts by weight to 30 parts by weight with respect to 100 parts by weight of the adhesive composition.

6. The adhesive composition of claim 1, further comprises a cation polymerization initiator.

7. A polarizing plate comprising:
   a polarizer;
   an adhesive layer provided on at least one surface of the polarizer, wherein the adhesive layer comprises the adhesive composition of claim 1; and
   a protective film provided on at least one surface of the adhesive layer.

8. The polarizing plate of claim 7, wherein the adhesive layer has a thickness of greater than 0 μm and less than or equal to 20 μm.

9. The polarizing plate of claim 7, wherein the protective film is an acryl-based film.

10. An image display device comprising:
    a display panel; and
    the polarizing plate of claim 7 on one surface or both surfaces of the display panel.

* * * * *